US008107883B2

(12) United States Patent
Peng et al.

(10) Patent No.: US 8,107,883 B2
(45) Date of Patent: Jan. 31, 2012

(54) APPARATUS AND METHOD FOR INTERFERENCE AVOIDANCE IN MIXED DEVICE-TO-DEVICE AND CELLULAR ENVIRONMENT

(75) Inventors: Tao Peng, Beijing (CN); Qianxi Lu, Beijing (CN); Hai Ming Wang, Beijing (CN); Shaoyi Xu, Beijing (CN)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 12/409,455

(22) Filed: Mar. 23, 2009

(65) Prior Publication Data

US 2010/0240312 A1 Sep. 23, 2010

(51) Int. Cl.
*H04B 15/00* (2006.01)
*H04B 17/00* (2006.01)
(52) U.S. Cl. .................... 455/63.1; 455/67.11
(58) Field of Classification Search ............. 455/63.1, 455/67.11, 114.2, 278.1, 296, 405, 423, 424, 455/522
See application file for complete search history.

(56) References Cited

U.S. PATENT DOCUMENTS

| 6,735,436 | B1 * | 5/2004 | McCauley et al. ............ 455/424 |
| 7,336,930 | B2 * | 2/2008 | Larsson et al. ............... 455/63.1 |
| 7,593,691 | B2 * | 9/2009 | Karabinis .................... 455/63.1 |
| 7,634,234 | B2 * | 12/2009 | Karabinis ................... 455/67.11 |
| 2009/0005094 | A1 | 1/2009 | Lee et al. |

FOREIGN PATENT DOCUMENTS

| EP | 2012443 A2 | 1/2009 |
| WO | 2005099174 A1 | 10/2005 |

OTHER PUBLICATIONS

International Search report and written Opinion, received in corresponding Patent Cooperation Treaty Application No. PCT/IB2010/000655, Dated Sep. 8, 2010, 13 pages.
Kaufman, Brett., et al., "Cellular Networks with an Overlaid Device to Device Network", 2008 42nd Asilomar Conference on Signals, Systems and Computers, Oct. 26, 2008, IEEE, Piscataway, NJ, USA, pp. 1537-1541, Conference Proceeding Article.
Peng, Tao,. et al., "Interference Avoidance Mechanisms in the Hybrid Cellular and Device-to-Device Systems", Personal Indoor and Mobile Radio Communications (PIMRC') 2009 IEEE 20th International Symposium, Sep. 13, 2009, IEEE, Piscataway, NJ, USA, pp. 617-621, Conference Proceeding Article.

(Continued)

*Primary Examiner* — Hai L Nguyen (57) ABSTRACT

In accordance with an example embodiment of the present invention, a method is disclosed that comprises collecting a set of neighbor cellular user equipment (UE) interferences from at least one neighbor cellular UE at a device-to-device (D2D) UE at least in part based on a decoded first uplink radio resource management (RRM) message and computing a first set of average neighbor UE interferences based on the set of collected neighbor cellular UE interferences. The method also comprises predicting at least one interference scenario at least in part based on the first set of average neighbor cellular UE interferences and a decoded second uplink RRM message. The method also comprises selecting a resource for data transmission to a pairing D2D UE at least in part based on the first set of average neighbor cellular UE interferences, and transmitting data over the selected resource to the pairing D2D UE.

20 Claims, 4 Drawing Sheets

OTHER PUBLICATIONS

Tao Peng, et al, Interference avoidance mechanisms in the hybrid cellular and device-to-device systems, Personal, Indoor and Mobile Radio Communications, 2009, IEEE, Piscataway, NJ, USA, Sep. 13, 2009.

Kaufman B et al, Cellular Networks With an Overlaid Device to Device Network, Signals, Systems and Computers, 2008 42nd Asilomar Conference on, Oct. 26, 2008, IEEE, Piscataway, NJ, USA, Oct. 26, 2008.

International Search Report and Written Opinion as issued by the Searching Authority for PCT Application No. PCT/IB2010/000655 filed on Mar. 3, 2010.

Communication Pursuant to Rules 161(2) and 162 EPC as issued by the European Patent Office on Nov. 3, 2011 for Application No. 10755507.0-1244.

* cited by examiner

APPARATUS AND METHOD FOR INTERFERENCE AVOIDANCE IN MIXED DEVICE-TO-DEVICE AND CELLULAR ENVIRONMENT

TECHNICAL FIELD

The present application relates generally to an apparatus and a method for interference avoidance in mixed device-to-device (D2D) and cellular environment.

BACKGROUND

In a cellular network mode, data traffic usually goes through centralized controller such as a base station (BS) even if the communicating parties are close to each other. Current cellular networks operate in this centralized mode, which is also termed cellular mode in this disclosure. One main benefit of the centralized operation is easy resource control and interference control. One potential drawback is less efficient resource utilization. A double amount of resources may be needed for a user equipment (UE) in a cellular mode. For example, a cellular UE may need to have a first radio resource allocated between the cellular UE and the base station and a second radio resource allocated between the base station and the other cellular UE. In comparison, a UE in a direct, device-to-device (D2D) mode may only need one radio resource between the UE and a pairing UE, when two users are sufficiently close to each other. Examples of the centralized controller may include NodeB (NB) of long-term evolution (LTE).

To help improve system throughput, a radio network may operate in a hybrid mode. In a hybrid mode, the UE may operate in the cellular mode if the other party is located far way and may operate in the D2D mode if the pairing UE is sufficiently close by. The hybrid mode operation is being explored in newer generations of network technologies such as $3^{rd}$ generation partnership project (3GPP) long-term evolution advance (LTE-A) and worldwide interoperability for microwave access (WiMax) network. One example of D2D mode network is an ad-hoc network where one D2D UE may set up a direct connection with the pairing UE via a handshake and competition procedure. Examples of cellular networks include widely deployed networks such as universal mobile telecommunications system (UMTS) network, code division multiple access (CDMA) network, Wimax network and 3GPP LTE networks.

SUMMARY

Various aspects of the invention are set out in the claims.

In accordance with an example embodiment of the present invention, a method comprises collecting a set of neighbor cellular user equipment interferences from at least one neighbor cellular UE at a device-to-device UE at least in part based on a decoded first uplink radio resource management message and computing a first set of average neighbor UE interferences based on the set of collected neighbor cellular UE interferences. The method also comprises predicting at least one interference scenario at least in part based on the first set of average neighbor cellular UE interferences and a decoded second uplink RRM message. The method also comprises selecting a resource for data transmission to a pairing D2D UE at least in part based on the first set of average neighbor cellular UE interferences, and transmitting data over the selected resource to the pairing D2D UE.

In accordance with another example embodiment of the present invention, an apparatus comprises a first module configured to compute a first set of average neighbor cellular UE interferences based on a set of collected neighbor cellular UE interferences; to predict an interference scenario at least in part based on the first set of average neighbor cellular UE interferences and a decoded second uplink RRM message; and to select a resource for data transmission to a pairing D2D UE at least in part based on the first set of average neighbor cellular UE interferences. The apparatus also comprises a second module configured to collect the set of neighbor cellular UE interferences from at least one neighbor cellular UE at least in part based on a decoded first uplink RRM message; and to transmit data over the selected resource at least in part based on the predicted interference scenario.

In accordance with another example embodiment of the present invention, a computer program product comprises a computer-readable medium bearing computer program code embodied therein for use with a computer, the computer program code comprising code for collecting a set of neighbor cellular UE interferences from at least one neighbor cellular UE at a D2D UE at least in part based on a decoded first uplink RRM message, code for computing a first set of average neighbor cellular UE interferences in part based on the set of collected neighbor cellular UE interferences. The computer program code also comprises code for predicting an interference scenario at least in part based on the first set of average neighbor cellular UE interferences and a second uplink RRM message; and code for selecting a resource for data transmission to a pairing D2D UE based on the first set of average neighbor cellular UE interferences; and code for transmitting data over the selected resource to the pairing D2D UE at least in part based on the predicted interference scenario.

BRIEF DESCRIPTION OF DRAWINGS

For a more complete understanding of example embodiments of the present invention, reference is now made to the following descriptions taken in connection with the accompanying drawings in which.

DETAILED DESCRIPTION

A UE may be allowed to operate in D2D mode in addition to the traditional cellular mode and may share the same resources as the cellular UEs. In addition, a system such as a 3G base station or similar device, e.g., NodeB and evolved NodeB may allocate the resource to cellular UEs in a dynamic way. This means that the resource allocation may not be predicted accurately by the accumulated knowledge. Thus a blind interference avoidance method may not work as well without any knowledge of any neighbor cellular resource allocation. Selecting the appropriate resources for D2D UEs to avoid or minimize the interference from cellular UEs is directly related to the D2D UE performance.

An example embodiment of the present invention and its potential advantages are best understood by referring to FIGS. 1 through 6 of the drawings, like numerals being used for like and corresponding parts of the various drawings.

Figure 1:
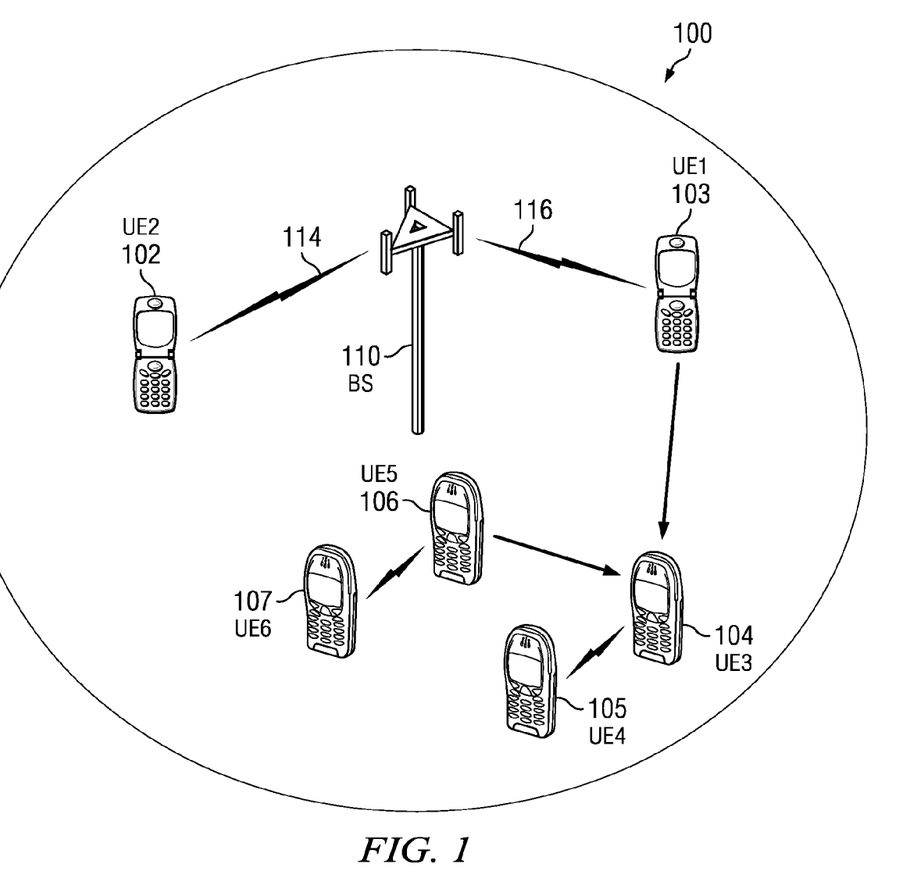
FIG. 1 illustrates an example wireless system.

FIG. 1 illustrates an example wireless system 100. The wireless system 100 may include a base station (BS) 110 and three sets of UEs 102 through 107. A first set of UEs includes cellular UE2 102 and UE1 103 that are coupled to the base station 110 via wireless link 114 and 116 and operate in a cellular mode. A second set of UEs includes UE3 104 and UE4 105 and may operate in a D2D transmission mode. The second set of D2D UEs may share uplink resource with the UE1 and UE2. A third set of D2D UEs, UE5 106 and UE6 107 is a set of D2D UEs and may share uplink resource with UE1 and UE2 to communicate with each other in the D2D transmission mode.

FIG. 1 shows a scenario where cellular UEs may interfere with the D2D UEs. While UE1 and UE2 are in cellular mode, UE3 and UE4 are in the D2D mode with UE3 being the receiver. Both cellular UE 1 and UE2 may generate interference to the D2D UE3 and UE4. Due to proximity, cellular UE1 may generate more interference than UE2 to D2D UE3 and UE4. Therefore, it would be beneficial if the pair UE3 and UE4 choose and reuse the resource allocated to the cellular UE2 to avoid stronger interference from UE1. The cellular UE interferences may be measured by one or more of the following parameters: a received signal power, a noise to signal ratio, a slow fading factor of signals, a fast fading factor of signals on a time and frequency coordinate, a path loss measure, and the like.

FIG. 1 also shows a second interference example from D2D UE5 to D2D UE3. Due to the close proximity to each other, the D2D UE5 may interfere with the data transmission of the D2D UE3 or vice versa. Thus, both D2D UE3 and UE5 may need to take into account the interference from neighbor D2D UEs, in addition to the interferences from neighbor cellular UEs.

Figure 3:
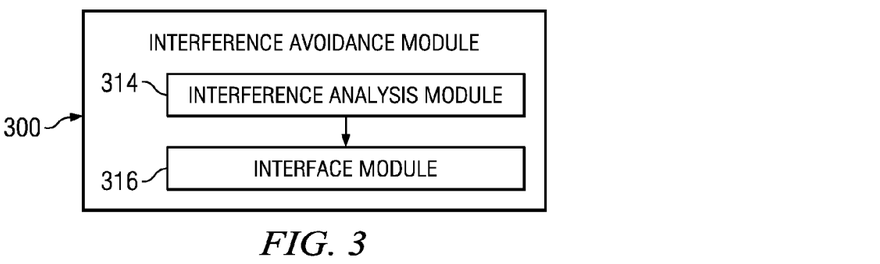
FIG. 3 illustrates an example interference avoidance module.

A D2D UE, for example, UE3, UE4, UE5 or UE6 may have an interference avoidance module 300 as one of its components to help avoid the interferences from the neighbor cellular UEs and D2D UEs while selecting a transmission resource and transmitting data on the selected resource. Details of the interference avoidance module 300 are illustrated in FIG. 3 and described thereinafter. The interference avoidance module 300 may measure the interference from neighbor cellular UEs, predict a potential interference scenario and select a radio resource that may have no or minimal interference for D2D mode communication.

Figure 2:
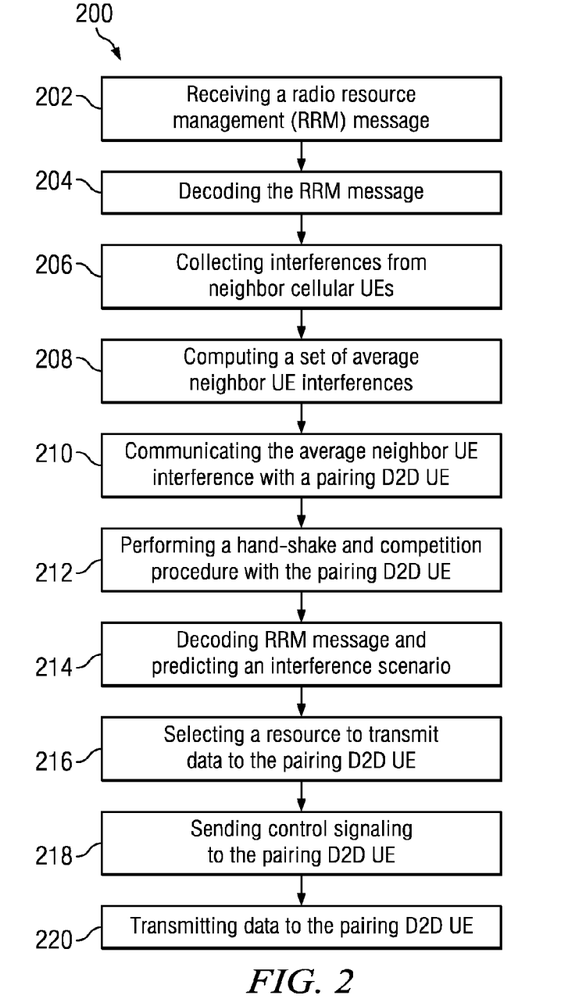
FIG. 2 illustrates an example method for interference avoidance in a mixed D2D and cellular environment.

FIG. 2 illustrates an example method 200 for interference avoidance in a mixed D2D and cellular environment. The method 200 may include receiving an uplink radio resource management (RRM) message at block 202, decoding the RRM message at block 204, and collecting interference measures from neighbor cellular UEs at block 206. The method 200 also includes computing a set of average neighbor UE interference at block 208, exchanging the average neighbor UE interference with a pairing D2D UE at block 210, and performing a hand-shake and a competition procedure with the pairing D2D UE at block 212. The method 200 may also include decoding RRM message and predicting an interference scenario at block 214, selecting a resource to transmit data to the pairing D2D UE at block 216, sending control signaling to the pairing D2D UE at block 218, and transmitting data to the pairing D2D UE at block 220. Other embodiments of the method 200 with different sequences of steps could be used without departing from the scope of this disclosure. In an example embodiment, the method 200 is performed by a D2D UE such as UE3 through UE6 of FIG. 1.

Receiving a radio resource management (RRM) message at block 202 may include receiving a broadcast protocol message from a coupled base station. In one example embodiment, an uplink WiMax mobile application part (MAP) message is broadcast and a UE within the cell of the base station may receive and decode the broadcast MAP message.

Decoding the uplink RRM message at block 204 may include extracting a relevant part of the received protocol message, interpreting the relevant part and organizing the extracted information. In one example embodiment, decoding the uplink RRM message at block 204 may include decoding MAP message, extracting an uplink RRM information element (IE) and obtaining resource allocation information of neighbor cellular UEs such as UE1 and UE2 of FIG. 1. Organizing the extracted information may include organizing neighbor cellular UE resource allocation information, such as time and frequency allocation for transmission into a table such as an average neighbor UE interference table.

Collecting interferences from neighbor cellular UEs at block 206 may include measuring the interference from a neighbor cellular UE such as UE1 of FIG. 1, and recording the actually measured interference, based on the resource allocation information of neighbor cellular UEs decoded from the RRM message. The interference may be measured by the received signal power or other parameters such as noise to signal ratio. Collecting the interference data from neighbour UEs may include collecting the interference data for all neighbour UEs over several transmission periods. A D2D UEs such as UE3 through UE 6 of the wireless system 100 of FIG. 1 may collect interference data from its perspective.

Figure 5:
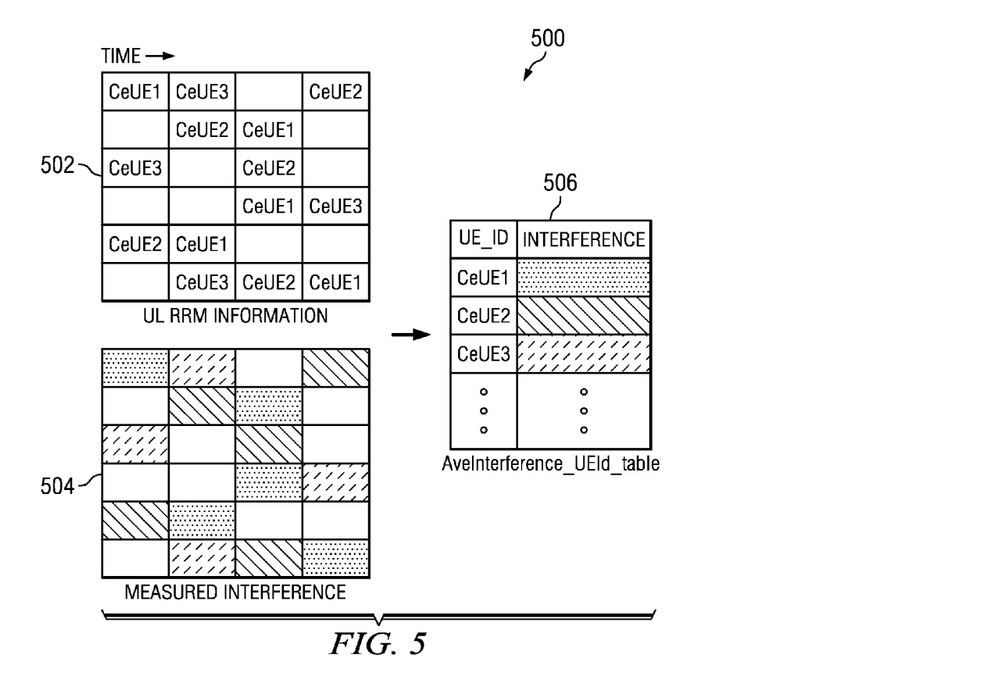
FIG. 5 illustrates an example of computing a set of average neighbor cellular UE interferences.

Computing a set of average neighbor UE interference at block 208 may include computing an average interference from interference data collected over an n transmission periods of time for each neighbor UE where n may be configurable and is equal to or grater than 1. Thus, for m neighbor UEs, n×m interference samples may be collected. For each transmission time period, a UE may be assigned a frequency channel and the average value of the interference is obtained from the interferences from multiple transmission periods over the same or different transmission frequency channels that have been allocated. For the purpose of interference avoidance, an average interference value may be sufficient for resource scheduling purpose. Computing the set of average neighbor UE interferences may also include obtaining an average neighbor UE interference value for each neighbor UE and obtaining an average neighbor UE interference table. An example embodiment of collecting interference data and computing average neighbor UE interferences is illustrated in FIG. 5 and described thereinafter.

Communicating the average neighbor UE interference table with a pairing D2D UE at block 210 may include sending the completed average neighbor UE interference table to a pairing D2D UE and may also include receiving a neighbor average UE interference table from the pairing D2D UE. In one example, UE4 105 may send the average neighbour UE interference table to its pairing D2D UE3 104 as shown in FIG. 1. Exchanging the average neighbour UE interference table may take place according to a specific network environment. For example, if the distance between the pairing D2D UEs is sufficiently short and the interference environment is virtually same, then an exchange of average neighbour UE interference tables may not be performed.

Exchanging the average neighbor UE interference table with a pairing D2D UE at block 210 may also include exchanging the differences between the two average neighbour UE interference tables. For example, the transmitting D2D UE may send its set of the neighbour cellular UE interferences and receive a set of the neighbour cellular UE interferences from the pairing D2D UE. The transmitting D2D UE may compare the received set of neighbour cellular UE interference with its own set and may send to the pairing D2D UE the differences between the two sets of average neighbour cellular UE interference tables. In this way, each D2D UE may be informed of the pairing UE's interferences. The interchanged sets of average neighbour cellular UE interferences may be represented by a number of bits for detailed level of measured interferences. Other means such as a single-bit indicator of whether or not the resource is available may also be used, depending on a desired level of overhead for control signalling.

Figure 4:
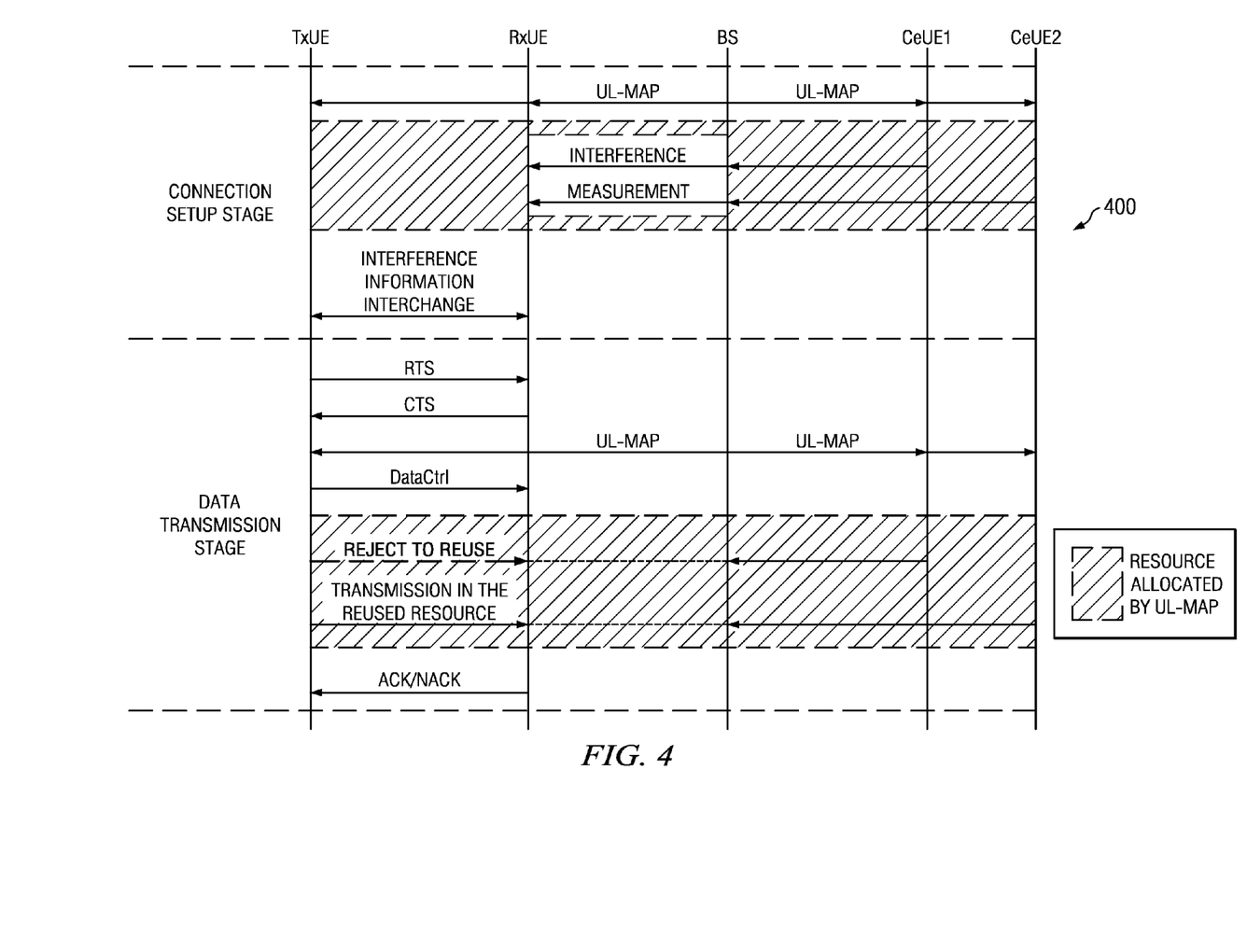
FIG. 4 illustrates a message flow diagram for neighbor UE interference avoidance.

Performing a hand-shake and a competition procedure with the pairing D2D UE at block 212 may include exchanging protocol messages and to inform each other of the neighbor UE interference information. Through this resource competition procedure, D2D mode signaling and data transmissions follow the same frame structure as the uplink of cellular network. Thus time relationship may be well defined in such a way that the D2D UEs may know which resource will be utilized at which specific time. Performing the handshake and a competition procedure at block 214 may include using a handshake protocol such as request to send (RTS) and clear to send (CTS) message exchanges. More details on the handshake and competition procedure between a pairing D2D UEs is illustrated in FIG. 4 and described thereinafter.

Figure 6:
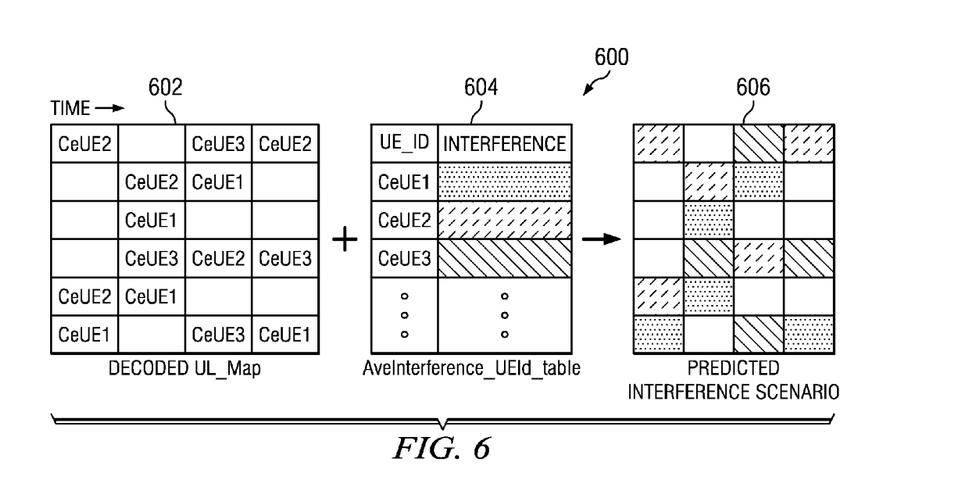
FIG. 6 illustrates an example of predicting interference scenarios.

Decoding RRM message and predicting an interference scenario at block 214 may include predicting a data transmission on an allocated resource for each neighbor cellular UE. The prediction may be based on the resource allocation data in the decoded uplink RRM message for a cellular uplink transmission by a cellular neighbor UE. Predicting the interference scenario may also include taking into account allocated resource for each neighbour cellular UE and the transmission time period allocated for the cellular UE. When data is transmitted over the selected resource for the D2D device, the transmitting D2D device may avoid generating harmful interference to cellular UEs' UL transmission based on the predicted interference scenario. More details on predicting interference scenarios are illustrated in FIG. 6 and described thereinafter.

Selecting a resource to transmit data to the pairing D2D UE at block 216 may include deciding on a radio resource at least in part based on the data in the average neighbor UE interference table so that the average interference is minimal. Selecting the resource may also involve taking into account the interference from its neighbor D2D UEs. For example, from the perspective of UE3 104 of FIG. 1, the interference from the pairing D2D UE4 105 and other neighbor D2D UEs including UE5 106 and UE6 107 also may be taken into consideration.

Sending control signaling to the pairing D2D UE at block 218 may include sending a protocol message to notify the pairing D2D UE of the selected resource and a time frame for transmission of data. One example implementation is to use WiMax physical downlink control channel (PDCCH) or an LTE equivalent signaling protocol so that the pairing D2D UE has the information for detection and decoding of the data transmission. The information sent to the pairing D2D UE may include the resource information, data format, and a hybrid automatic repeat-reQuest (HARQ), among others. A time relationship is already defined between this D2D UE and its pairing D2D UE and the data transmission may begin after the control signaling informs the pairing D2D UE of the resource to be used for transmission.

Transmitting data to the pairing D2D UE at block 220 may include considering the predicted interference scenarios and commencing data transmission on the selected resource at a time when a conflict with a transmission from a neighbor cellular UE is avoided. The pairing D2D UE may send an acknowledgement or a negative acknowledgement based on whether the transmitted data is received and received correctly. The data may be transmitted to the pairing D2D UE in one of a number of modes including a time-division duplex (TDD) transmission mode, a frequency-division duplex (FDD) transmission mode, and the like.

FIG. 3 illustrates an example interference avoidance module 300. The interference avoidance module 300 may include an interference analysis module 314 and an interface module 316. The method 200 of FIG. 2 may be carried by the interference avoidance module 300.

The interference analysis module 314 may compute a first set of average neighbor cellular UE interferences based on a set of collected neighbor cellular UE interferences. The interference analysis module 314 may also select a resource for data transmission to a pairing D2D UE at least in part based on the first set of average neighbor cellular UE interferences. The interference analysis module 314 may also predict an interference scenario at least at least in part based on the first set of average neighbor cellular UE interferences and a latest uplink RRM message. The interference analysis module 314 may in collaboration with the interface module 316 to make an instantaneous measurement of interferences from each of the neighbor cellular UEs and select the resource in part based on the instantaneous measurement of interferences from each of the neighbor cellular UEs. The instantaneous measurements are based on a fast fading factor on a time and frequency coordinate of the allocated resource and in part are based on a path-loss and slow fading factor of signals.

The interface module 316 may receive from the coupled base station a first uplink mobile application protocol (MAP) message including a first uplink RRM message and to decode the first uplink RRM message. The interface module 316 may collect the set of neighbor cellular UE interferences from one or more neighbor cellular UEs at least in part based on the decoded first uplink RRM message. The interface module 316 may receive from the coupled base station a second uplink MAP protocol message including a second uplink RRM message and decode the second uplink RRM message for the purpose of predicting one or more interference scenarios. The interface module 316 may perform in collaboration with the interference analysis module 314 a handshake and a competition procedure with the pairing D2D UE using a request-to-send (RTS) and clear-to-send (CTS) message exchange to obtain a set of neighbor D2D UE interferences. The interface module 316 may subtract the set of the neighbor D2D UE interferences from the first set of average neighbor cellular UE interferences. The interface module 316 may transmit data over the selected resource at least in part based on the predicted interference scenario.

Although FIG. 3 illustrates one example of an interference avoidance module at one D2D UE, various changes may be made to the interference avoidance module 300 without departing from the principles of the invention. For example, some functions of the interference analysis module 314 may be performed by the interface module 316 or vice versa. Additional hardware or software modules may be added to perform portion of functions of the interference analysis module 314 and/or the interface module 316.

FIG. 4 illustrates an embodiment of a message flow diagram 400. In this example flow diagram, there is one set of cellular UEs, CeUE1 and CeUE2 and one set of D2D UEs, RxUE and TxUE. The UEs are coupled to a base station BS. The flow diagram starts with the BS broadcasting an uplink MAP message that includes a RRM message to allocate radio resources to CeUE1 and CeUE2. The MAP message reaches the D2D UE RxUE and the cellular UEs CeUE1 and CeUE2. The D2D UEs TxUE and RxUE enter a connection setup stage and start measuring and collecting the interferences from the cellular UEs CeUE1 and CeUE2 while the cellular UEs CeUE1 and CeUE2 are transmitting data. The data transmission between CeUE1 and CeUE2 may be time-division multiplexed or orthogonal in frequency dimension or in both time and frequency dimension. Both the D2D UEs TxUE and RxUE may compute a set of average neighbor cellular UE interference of its own and then exchange the computed average neighbor cellular UE interferences.

Then the D2D UEs TxUE and RxUE may enter a data transmission stage as indicated by the lower left side of the flow diagram 400 in FIG. 4. TxUE may send a RTS message to RxUE and the RxUE may respond with a CTS message. The message exchange serves as a part of handshake and competition procedure to establish a D2D UE pairing between the two D2D UEs. The D2D UEs continue to monitor the broadcast message from the BS and use a second, latest uplink MAP message to predict when the cellular UEs may use the allocated resource based on the latest received MAP message. Based on the predicted scenarios, D2D UEs may transmit data over the resources where the predicted interference from the cellular UE may be weak and reject the resources where the interference may by strong. For example, the interference from CeUE1 may be weak while the interference from CeUE2 of FIG. 4 may be strong. This information is sent to RxUE via a control signaling. The D2D RxUE may send acknowledgement (ACK) or negative ACK to the D2D TxUE to indicate whether the data transmission on the shared resource was successful. The interference from cellular UEs may change during the data transmission stage and the change may be generally slow. Thus the required signaling overhead between the D2D UEs in order to accommodate the slow change of interferences from the neighbor cellular UEs may be relatively low.

In data transmission stage, the D2D UEs RxUE and TxUE may continue monitoring and measuring the interferences from the neighbor cellular UEs and if there is a need, the computed set of average neighbor cellular UE interference may be updated with the newly measured interferences. The D2D UEs TxUE and RxUE may use the RTS and CTS messages to update the computed average neighbor cellular UE interferences.

FIG. 5 illustrates an example 500 of computing a set of average neighbor cellular UE interferences. The example 500 may include an uplink RRM information table 502, a measured neighbor UE interference table 504 and an average neighbor UE interference table 506. The uplink RRM information table 502 shows a horizontal time scale and a vertical radio resource scale. There are four transmission periods for six transmission frequency channels allocated to three cellular UEs CeUE1, CeUE2 and CeUE3. Some frequency channels for certain transmission periods are not allocated, which are shown as blank. The uplink RRM information table 502 may part of a MAP message and may be broadcast to the UEs including the D2D UEs. The uplink RRM information table 502 shows that the two-dimension slot of the first frequency channel and first transmission period is allocated to CeUE1 for data transmission, the slot of the first transmission period and third frequency channel to CeUE3, and so on. More than one time-frequency slot may be allocated to a UE. For example, as shown in column three of the uplink RRM information table 502, two time-frequency slots are allocated to CeUE1, and two slots to CeUE2.

The measured interference table 504 may indicate the interferences from the neighbor cellular UEs CeUE1, CeUE2 and CeUE3 measured and collected by a D2D UE for the corresponding transmission time periods. For example, the collected interferences for the first transmission period on the first frequency channel were from CeUE1, the collected interferences from the first transmission period on the third frequency channel are from CeUE3, and so on.

The average neighbor UE interference table 506 shows the results from averaging the interferences from the measured interference table 504. For example, an average interference is obtained for CeUE1 by averaging five interferences in the measured interference table 504, including first slot in the column 1 of the table, fifth slot of the column 2, second and fourth slots of the column 3, and the last slot of the column 4.

FIG. 6 illustrates an example 600 of predicting interference scenarios. The example 600 may include a resource allocation table 602 from a latest uplink MAP message, an average neighbor UE interference table 604 and a predicted scenario table 606.

The contents of the resource allocation table 602 and the average neighbor UE interference table 604 are similar to that of the uplink RRM information table 502 and the average neighbor UE interference table 506. The predicted scenario table 606 may be obtained by combining the resource allocation table 602 and the average neighbor UE interference table 604. The predicted scenario table 606 may tell, based on the resource allocation table 602, which cellular UEs is scheduled to transmit data at which time frame. The predicted scenario table 606 may also predict based on the average neighbor UE interference table 604 how much interference each cellular UE may cause at the time frame.

An apparatus is further disclosed that comprises a neighbor UE interference avoidance means configured to compute a first set of average neighbor cellular UE interferences based on a set of collected neighbor cellular UE interferences, to predict an interference scenario at least in part based on the first set of average neighbor cellular UE interferences and a decoded second uplink RRM message, and to select a resource for data transmission to a pairing D2D UE at least in part based on the first set of average neighbor cellular UE interferences. The apparatus further comprises a means configured to collect the set of neighbor cellular UE interferences from at least one neighbor cellular UE at least in part based on a decoded first uplink RRM message, and to transmit data over the selected resource at least in part based on the predicted interference scenario.

Without in any way limiting the scope, interpretation, or application of the claims appearing below, a technical effect of one or more of the example embodiments disclosed herein may be allowing a set of D2D UEs to share resources with the neighbor cellular UEs with minimal interference from the neighbour cellular UEs based on historical neighbour UE interference data. Another technical effect of one or more of the example embodiments disclosed herein may be may be allowing the D2D UEs to share resources with the neighbor cellular UEs with minimal interference from the neighbour cellular UEs based on predicted neighbor UE interference scenarios.

Embodiments of the present invention may be implemented in software, hardware, application logic or a combination of software, hardware and application logic. The software, application logic and/or hardware may reside on a mobile station, a base station or other mobile computing device. If desired, part of the software, application logic and/or hardware may reside on a mobile station, part of the software, application logic and/or hardware may reside on a base station, and part of the software, application logic and/or hardware may reside on a second mobile station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. A method, comprising:
   collecting a set of neighbor cellular user equipment (UE) interferences from at least one neighbor cellular UE at a device-to-device (D2D) UE at least in part based on a decoded first uplink radio resource management (RRM) message;
   computing a first set of average neighbor cellular UE interferences based on the set of collected neighbor cellular UE interferences;
   predicting at least one interference scenario at least in part based on the first set of average neighbor cellular UE interferences and a decoded second uplink RRM message;
   selecting a resource for data transmission to a pairing D2D UE based at least in part on the first set of average neighbor cellular UE interferences; and
   transmitting data over the selected resource to the pairing D2D UE.

2. The method of claim 1, further comprising receiving from a coupled base station a first uplink protocol message that includes the first uplink RRM message and decoding the uplink RRM message and a second uplink MAP protocol message that includes the second uplink RRM message.

3. The method of claim 2, wherein selecting the resource further comprises selecting an uplink resource allocated by the coupled base station based in part on the at least one predicted interference scenario, the uplink resource being shared between the D2D UE and at least one neighbor cellular UE.

4. The method of claim 1, further comprising communicating to the pairing D2D UE the first set of average neighbor cellular UE interferences.

5. The method of claim 4, further comprising receiving a second set of average neighbor cellular UE interferences from the pairing D2D UE, and sending to the pairing D2D UE one or more differences between the first set of average neighbor cellular UE interferences and the second set of average neighbor cellular UE interferences.

6. The method of claim 1, wherein collecting the set of neighbor cellular UE interferences further comprises creating a neighbor cellular UE table based on resource allocation data in the first uplink RRM message and collecting n interference measures from each neighbor cellular UE on the cellular neighbor UE table for n transmission periods wherein n is a configurable number and equal to or greater than 1.

7. The method of claim 6, wherein computing the first set of average neighbor cellular UE interferences further comprises obtaining an average interference from the n interferences for each neighbor cellular UE on the neighbor cellular UE table.

8. The method of claim 7, further comprising:
   performing a handshake and competition procedure with the pairing D2D UE,
   obtaining a set of neighbor D2D UE interferences,
   subtracting the set of neighbor D2D UE interferences from the set of neighbor cellular UE interferences, and
   sending a control signaling to inform the pairing D2D UE.

9. The method of claim 8, wherein predicting the at least one interference scenario further comprises predicting a data transmission time on an allocated resource for each neighbor cellular UE on the cellular neighbor UE table based at least in part on the resource allocation data in the second uplink RRM message.

10. The method of claim 1, further comprising updating the first set of average neighbor cellular UE interferences based on one of a regular schedule and an on-demand schedule.

11. The method of claim 1, wherein transmitting the data to the pairing D2D UE further comprises transmitting the data to the pairing D2D UE over the selected resource in one of a time-division duplex (TDD) transmission mode and a frequency-division duplex (FDD) transmission mode.

12. An apparatus, comprising:
   a first module configured
   to compute a first set of average neighbor cellular user equipment (UE) interferences based on a set of collected neighbor cellular UE interferences;
   to predict an interference scenario at least in part based on the first set of average neighbor cellular UE interferences and a decoded second uplink radio resource management (RRM) message; and
   to select a resource for data transmission to a pairing device-to-device (D2D) UE at least in part based on the first set of average neighbor cellular UE interferences; and
   a second module configured
   to collect the set of neighbor cellular UE interferences from at least one neighbor cellular UE at least in part based on a decoded first uplink RRM message; and
   to transmit data over the selected resource.

13. The apparatus of claim 12, wherein the selected resource is one of an uplink time division duplex (TDD) transmission link and an uplink frequency division duplex (FDD) transmission link allocated by a coupled base station.

14. The apparatus of claim 12, wherein the second module is further configured to receive from the coupled base station a first uplink mobile application part (MAP) message including the first uplink RRM message, to decode the first uplink RRM message, to receive a second uplink MAP message including the second uplink RRM message and to decode the second uplink RRM message.

15. The apparatus of claim 12, wherein the selected resource is an uplink resource shared with at least one of a neighbor worldwide interoperability for microwave access (WiMax) UE, a neighbor $3^{rd}$ generation partner project (3GPP) UE, and a neighbor long-term evolution (LTE) UE.

16. The apparatus of claim 12, wherein the collected set of neighbor cellular UE interference is measured by one or more of a received signal power, a noise to signal ratio, a slow fading factor of signals, a fast fading factor of signals on a time and frequency coordinate, and a path loss measure.

17. The apparatus of claim 12, wherein the first module is further configured to make an instantaneous measurement of neighbor cellular UE interferences from each of the at least one neighbor cellular UE and to select the resource in part based on the instantaneous measurement of neighbor cellular UE interferences from each of the at least one neighbor cellular UE.

18. The apparatus of claim 12, wherein the apparatus is one of a WiMax UE, a LTE UE and a 3GPP UE.

19. The apparatus of claim 12, wherein, the second module is further configured to perform a handshake and a competition procedure with the pairing D2D UE based on exchanges of a request-to-send message and a clear-to-send message to obtain a set of neighbor D2D UE interferences and to subtract the set of the neighbor D2D UE interferences from the set of neighbor cellular UE interferences.

20. A computer program product comprising a computer-readable medium bearing computer program code embodied therein for use with a computer, the computer program code comprising:
    code for collecting a set of neighbor cellular user equipment (UE) interferences from at least one neighbor cellular UE at a device-to-device (D2D) UE at least in part based on a decoded first uplink radio resource management (RRM) message;
    code for computing a first set of average neighbor cellular UE interferences in part based on the set of collected neighbor cellular UE interferences;
    code for predicting an interference scenario at least in part based on the first set of average neighbor cellular UE interferences and a second uplink RRM message;
    code for selecting a resource for data transmission to a pairing D2D UE based on the first set of average neighbor cellular UE interferences; and
    code for transmitting data over the selected resource to the pairing D2D UE.

* * * * *